(12) United States Patent
Delahunty et al.

(10) Patent No.: US 8,392,911 B2
(45) Date of Patent: Mar. 5, 2013

(54) DOWNLOAD DISCOVERY FOR WEB SERVERS

(75) Inventors: Brian Delahunty, Redmond, WA (US); Carlos Aguilar Mares, Snoqualmie, WA (US); Nitasha Verma, Kirkland, WA (US); Robert J. Lucero, Seattle, WA (US); Mai-Ian T. Bukovec, Seattle, WA (US); William J. Staples, Duvall, WA (US); Crystal L. Hoyer, Seattle, WA (US); Andrew Philip Birck, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1092 days.

(21) Appl. No.: 12/122,501

(22) Filed: May 16, 2008

(65) Prior Publication Data

US 2009/0288081 A1    Nov. 19, 2009

(51) Int. Cl.
 *G06F 9/445* (2006.01)
(52) U.S. Cl. ........ 717/176; 717/168; 717/169; 717/170; 717/171; 717/172; 717/173; 717/174; 717/175; 717/177; 717/178
(58) Field of Classification Search ........... 717/168–178
 See application file for complete search history.

(56) References Cited

U.S. PATENT DOCUMENTS

| | | | | |
|---|---|---|---|---|
| 5,798,785 | A * | 8/1998 | Hendricks et al. | 725/46 |
| 5,884,037 | A * | 3/1999 | Aras et al. | 709/226 |
| 5,977,964 | A * | 11/1999 | Williams et al. | 715/721 |
| 6,067,623 | A * | 5/2000 | Blakley et al. | 726/5 |
| 6,272,492 | B1 * | 8/2001 | Kay | 1/1 |
| 6,687,745 | B1 * | 2/2004 | Franco et al. | 709/219 |
| 6,990,660 | B2 | 1/2006 | Moshir et al. | |
| 7,080,371 | B1 * | 7/2006 | Arnaiz et al. | 717/170 |
| 7,126,491 | B2 | 10/2006 | Funk et al. | |
| 7,140,014 | B2 * | 11/2006 | Coryell et al. | 717/176 |
| 7,233,790 | B2 | 6/2007 | Kjellberg et al. | |
| 7,970,877 | B1 * | 6/2011 | Ponna | 709/223 |
| 2002/0085587 | A1 * | 7/2002 | Mascolo | 370/477 |
| 2003/0084138 | A1 | 5/2003 | Tavis et al. | |
| 2004/0133571 | A1 * | 7/2004 | Horne et al. | 707/3 |

(Continued)

FOREIGN PATENT DOCUMENTS

WO        0054124        9/2000

OTHER PUBLICATIONS

Ghini, V., et al., "Smart Download on the Go: A Wireless Internet Application for Music Distribution over Heterogeneous Networks", Jun. 2004, 8 pages.

*Primary Examiner* — Chat Do
*Assistant Examiner* — Sergio J Curbelo, III
(74) *Attorney, Agent, or Firm* — Workman Nydegger (57) ABSTRACT

Facilitating installation of additional functionality on a web server. The method includes at a data store, receiving a request from a client to access programmatic code units. The data store includes programmatic code units. The programmatic code units are configured to provide additional web server functionality when installed at a web server. The client is distinct and separate from the data store. The method further includes, at the data store, providing information about one or more programmatic code units to the client. Input is received from the client selecting one or more programmatic code units to be installed on a web server. The web server is separate and distinct from both the data store and the client. The one or more selected programmatic code units are sent to the web server, whereafter the one or more selected programmatic code units are installed on the web server.

16 Claims, 3 Drawing Sheets

U.S. PATENT DOCUMENTS

| | | |
|---|---|---|
| 2004/0158811 A1 | 8/2004 | Guthrie et al. |
| 2004/0177096 A1* | 9/2004 | Eyal et al. ................. 707/104.1 |
| 2004/0215706 A1 | 10/2004 | Lavender et al. |
| 2004/0261071 A1* | 12/2004 | Chuang et al. ................ 717/170 |
| 2005/0216362 A1* | 9/2005 | Navar et al. ..................... 705/26 |
| 2005/0249196 A1* | 11/2005 | Ansari et al. .................. 370/352 |
| 2006/0069753 A1* | 3/2006 | Hu et al. ....................... 709/220 |
| 2006/0075001 A1* | 4/2006 | Canning et al. ............... 707/203 |
| 2006/0085517 A1 | 4/2006 | Kaurila |
| 2006/0085826 A1 | 4/2006 | Funk et al. |
| 2006/0229930 A9* | 10/2006 | Gottfurcht ...................... 705/10 |
| 2007/0169099 A1 | 7/2007 | Rao et al. |
| 2007/0191111 A1 | 8/2007 | Sylla et al. |

* cited by examiner

DOWNLOAD DISCOVERY FOR WEB SERVERS

BACKGROUND

Background and Relevant Art

Modern computing systems have the capability to be interconnected with one another. For example, computing system may be connected via various direct cable connections, via wired or wireless network connections, via interconnected busses, and the like. Using network connections, computer systems are capable of distributed data sharing and access. Network connected repositories can provide data to connected computer systems.

Some systems that provide data do so using web servers. Web servers can be installed on host computer systems in intranet environments or connected to the Internet to allow computer systems with compatible access applications, such as a browser, ftp client, VoIP client, multimedia player client, or other client to communicate with the web server on the host computer system.

Some web server software includes basic functionality for enabling host systems to provide data and services. If advanced functionality is desired, additional modules and/or applications can be installed on the host. For example, if database functionality is required, a database application can be installed at the host computer system and a module configured to interact with the database can be installed on the web server at the host computer system.

In another example, suppose that the web server delivers video content. Previously, it was thought that video content should be provided as quickly as possible and cached at a client system so as to be readily available. However, recent studies have shown that most viewers only watch a small portion of the video before abandoning the video and selecting another video. If large amounts of data are cached, then bandwidth is wasted to provide video content that will not be viewed. Thus, the conventional wisdom is that data should be throttled so that video content is provided such that only small portions of the video data are cached. To accomplish the throttling functionality, a throttling module may be installed at the web server on the host computer system.

To find modules or applications, web site administrators have not previously had an efficient way of finding and selecting modules and applications. Rather, the web site administrators had to know which modules or applications were desired and where to find the modules and applications. The web site administrator would then need to download an application or module to the host computer system and install it at the host computer system.

Additionally, the host computer systems are often owned and controlled by third parties such as hosting companies such that web server administrators may not have installation rights to directly install applications or modules on the host computer systems. Rather, the web server administrator must direct a systems administrator at the hosting company to install the application or module on the host computer system.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment includes a method of facilitating installation of additional functionality on a web server. The method includes, at a data store, receiving a request from a client to access information about programmatic code units. The programmatic code units may be applications or modules. The data store includes programmatic code units. The programmatic code units are configured to provide additional web server functionality when installed at a web server. The client is distinct and separate from the data store. The method further includes, at the data store, providing information about one or more programmatic code units to the client. Input is received from the client selecting one or more programmatic code units to be installed on a web server. The web server is separate and distinct from both the data store and the client. The one or more selected programmatic code units are sent to the web server, where after the one or more selected programmatic code units are installed on the web server.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments include functionality for facilitating additions of features to web servers using modules and other software. In particular, it may be desirable to add additional functionality to a web server, but it may be difficult to locate the appropriate modules. Further, a web server administrator may not be aware of modules that are appropriate and installable. Thus, embodiments may facilitate locating and installing modules or other software.

Some embodiments include the ability to evaluate profile information, and based on the profile information, a user is provided with a list of modules or other software that may be appropriate for the web server. The user can then select one or more of the listed modules or other software which causes the selected modules or other software to be installed on a web server. Web server profile information may include information related to one or more of modules already installed on a web server, administrators who manage the web server, users who use the web server or based on other factors.

Some embodiments may include functionality for facilitating the installation of the modules or other software by user interaction with a client that is separate from the web server itself and is separate from a repository where modules and other software are stored. In particular, a repository may provide information to a client machine about modules or other software available at the repository for installation on the client. The client can then display a listing of available modules or other software to a user. The user can then select modules to install. The modules can then be installed on the web server. Installation may be automatic without additional user intervention, by the repository interacting directly with the web server or by the client acting as an intermediary for providing selected modules to the web server.

Figure 1:
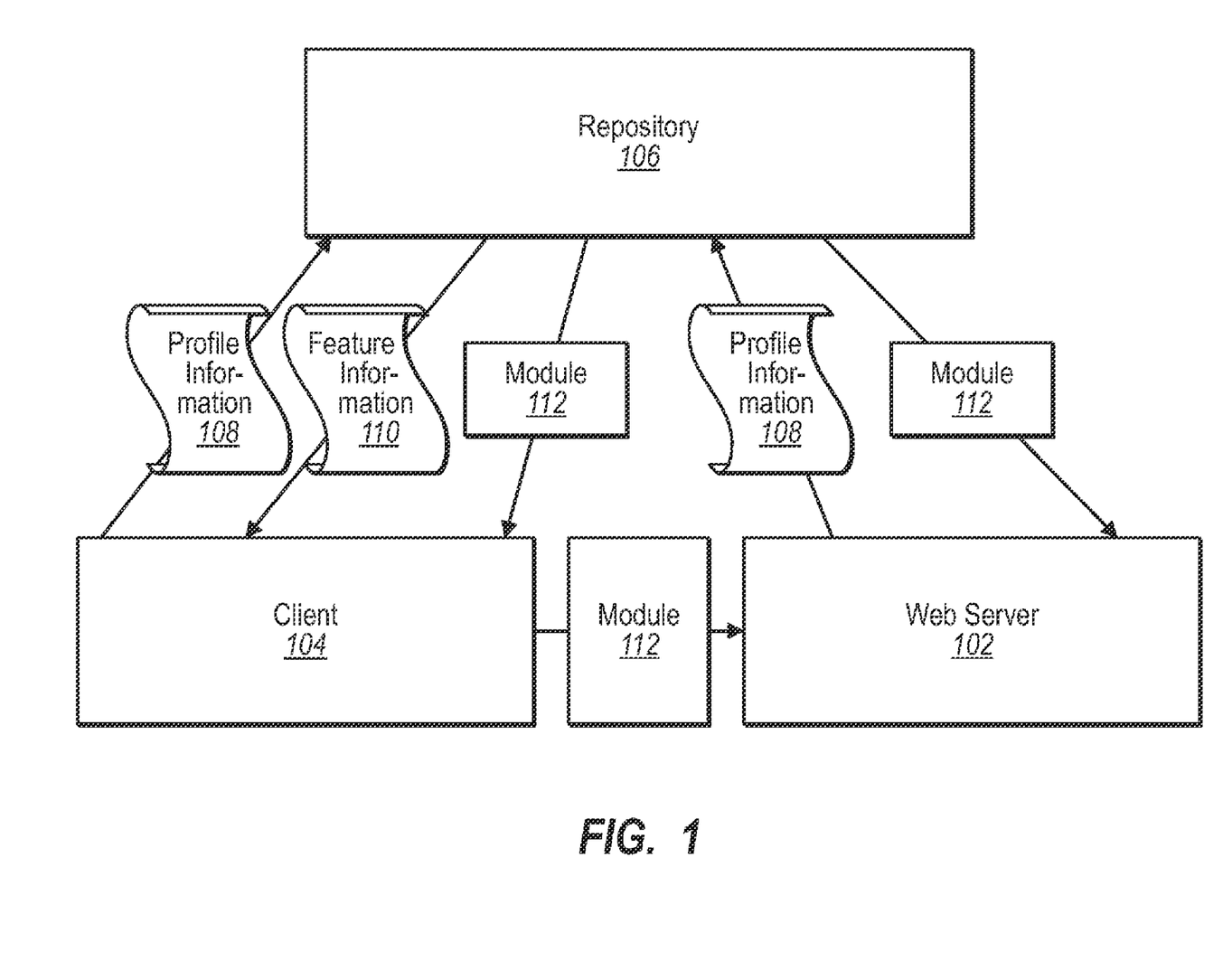
FIG. 1 illustrates an topology including a web server, a repository, and a client.

Referring now to FIG. 1 example environment is illustrated. In the example environment a web server 102 is connected to a client 104 and a repository 106. An administrator of the web server 102 may communicate with the web server 102 through the client 104. The repository 106 includes modules and other software that may be installed on the web server 102.

Illustrating now various features and functionality of some embodiments, an administrator of the web server, interacting with the web server 102 through a client 104 may be able to specify features to be installed on the web server 102. Installation of the features maybe facilitated using profile information about the web server 102. For example, profile information 108 may be sent from the client to the repository 106. The repository 106 can then provide feature information 110 based on the profile information 108. The feature information 110 may include information regarding modules or other software available from the repository 106 that can be installed on the web server 102.

Installation can occur, in one embodiment, by the repository 106 providing the module or other software directly to the web server 102 without first providing it to the client 102. In an alternative embodiment a module or other software can be provided to the client 104, where it can then be sent to and installed on the web server 102. In some embodiments, the client 104 and web server 102 may be installed on the same physical machine, but may nonetheless be separate computing entities. In other embodiments, the client 104 and web server 102 may be installed on different physical machines.

Illustrating now additional details about the profile information 108, the profile information 108 may include various forms of information and information from a number of different sources. For example, in one embodiment, the profile information 108 includes information about modules and/or other software installed at the web server 102. In some of these embodiments, the profile information 108 may be sent directly from the web server 102 to the repository 106. Further, in some of the embodiments where profile information 108 includes information about modules and/or other software installed at the web sever 102, profile information 108 may be sent, additionally or alternatively, from the client 102 to the repository 106.

Profile information 108 specifying modules and applications installed at the web server 102 may be used by the repository 106 to determine what feature information 110 to send the client 104. For example, the repository 106 may include in feature information 110 information related to updates to software or modules installed at the web server 102. Additionally or alternatively, the repository 106 may include feature information 110 about modules or other software that provides additional functionality to modules and other software installed at the web server 102. Further still, the repository 106 may include feature information 110 about modules that are commonly installed at web servers including modules or software similar to the modules or other software installed the web server 102.

The profile information 108 may additionally or alternatively include information about administrators managing the web server 102. For example, an administrator may create an account with the repository 106. The administrator may then log in, through the client 104, to the repository 106. Profile information 108 stored at the repository about the administrator can be used to select modules or other software of the interest to the administrator for installation on the web server 102. The profile information 108 that includes information about an administrator of the web server 102 may gather information based on a number of different factors and from a number of different sources. For example, an administrator may select categories of interest where the category information may then be included in the profile information 108.

Alternatively or additionally, profile information 108 may include information based on an administrator's previous interaction with the repository 106. For example, if an administrator has selected certain modules or other software for download and installation, related modules or other software may be identified as being of possible interest to the administrator by using profile information 108 that logs an administrators previous modules or other software selections.

In an alternative embodiment, profile information 108 may include additionally or alternatively information about users of the web server 102. Such profile information may include locations from which users typically access the web server 102, types of connections used by users to access the web server 102, types of content requested from the web server 102 etc. For example, if a large number of users in a particular geographical location attempt to access the web server 102, the profile information 108 may include a notation so indicating. When an administrator accesses the repository 106, the repository 106 may suggest that modules using certain cultural language packs be installed by the administrator on the web server 102. Similarly, if using the profile information 108 it can be determined that users request large amounts of video data from the web server 102, the repository may suggest the use of a throttling module that can be installed at the web server 102 to at conserve network bandwidth.

The repository 106 may send the feature information 110 organized in a number of different fashions. For example, the feature information 110 may be sent to the client 104 in the form of a web page with a particular layout. The layout of the webpage may organize suggested modules or other software according to a given priority or organization. For example, modules may be organized according to popularity based on other administrators reviews or number of downloads of a given module. Alternatively, or additionally, modules may be organized according to relevance based on modules already installed at the web server 102, or other profile information 108.

The feature information 110 may further include additional information related to features provided by external sources. For example, the feature information 110 may include user reviews of modules or other software. The feature information 110 may include blog information where administrators have blogged about the feature. Such blog information may be gathered by Internet search engine functionality or by other linking to the logging information.

As described previously, an administrator at the client 104 may cause a module 112 to be installed at the web server 102. In some embodiments, this may be done using a one click interface where the administrator at the client 104 selects a module 112 for installation on the web server 102. In some embodiments, this may occur by an administrator selecting an interactive user interface element caused to be displayed by the feature information 110. As explained previously, the feature information 110 may be included in the form of a web page, such that the web page code can specify the display of the interactive user interface element. Interaction with the user interface element may cause the repository 106 to send the module 112 to the web server 102, exclusive of further interaction with the client 104, where it will be installed. In this example, the administrator at the client 104 does not have to personally install the module 112 at the web server, but rather directs the automatic installation of the module 112 at the web server 102 or directs an administrator of the machine on which the web server 102 is installed to install the module 112.

The web server 102 may include authentication functionality to determine that an administrator at the client 104 has appropriate rights for installing modules at the web server 102. For example, an administrator at the client 104 may have rights to cause the installation of certain modules at the web server while not having rights to install other modules at the web server 102. For example, if the web server 102 is maintained by a third party that rents access to the administrator at the client 104, then administrator rights for the administrator may be limited based on the rental agreement for the use of the web server 102. Such agreements may limit bandwidth or functionality.

The following discussion now refers to a number of methods and method acts that may be performed. It should be noted, that although the method acts may be discussed in a certain order, no particular ordering is necessarily required unless specifically stated, or required because an act is dependent on another act being completed prior to the act being performed.

Figure 2:
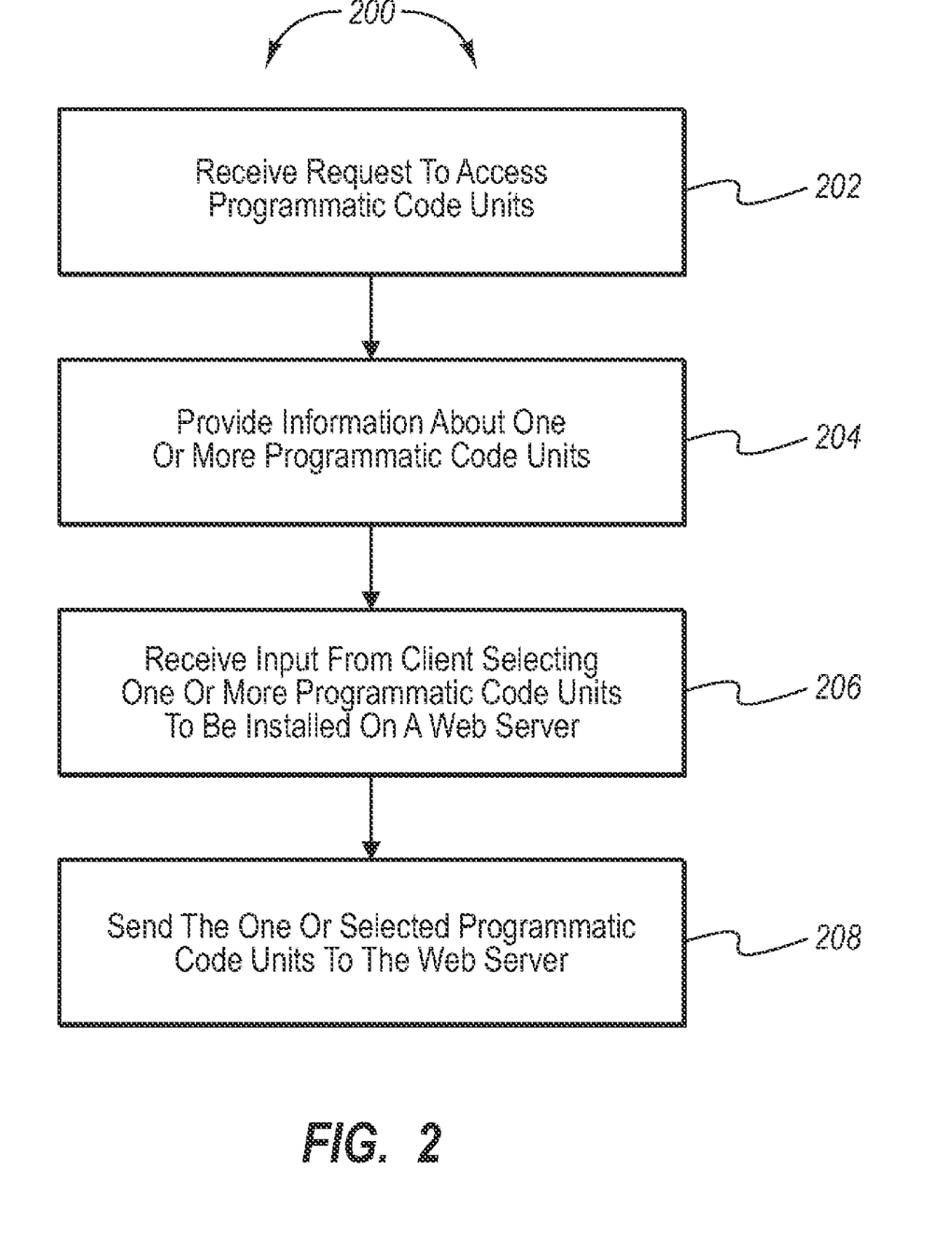
FIG. 2 illustrates a method of facilitating installation of additional functionality on a web server.

One method may be practiced in a computing environment where the computing environment includes one or more web servers. The method includes acts for facilitating installation of additional functionality on a web server. The method includes receiving a request from a client to access programmatic code units (act 202). For example, this may be performed at a data store, such as the repository 106 receiving a request from the client 104 in response to administrator interaction at the client 104. The data store includes programmatic code units, such as modules 112 or other software. The programmatic code units are configured to provide additional web server functionality when installed at a web server.

The method 200 further includes an act of providing information about one or more programmatic code units to a client (act 204). For example a data store such the repository 102 may send feature information 110 to the client 104. As noted previously, information about one or more programmatic code units may be provided by sending information in the form of html or other code.

The method 200 further includes receiving input from the client selecting one or more programmatic code units to be installed on a web server (act 206). For example, a data store such as the repository 102 may receive input from an administrator at the client 104. In one embodiment, this may be accomplished by receiving input from a user interacting with a user interface element such as a link, button, or other element.

The method 200 further includes sending the one or more selected programmatic code units to the web server (act 208). The one or more selected programmatic code units are then installed on the web server.

In one embodiment, sending the one or more selected programmatic code units to the web server (act 208) may include sending the one or more selected programmatic code units to the client. The client then sends to one or more selected programmatic code units to the web server. The one or more selected programmatic code units can then be installed at the server. Notably, in some embodiments, installation may occur by an administrator at the machine where the web server is installed installing the programmatic code units. In other embodiments, the web server may include an application programming interface (API) accessible by programming at the client allowing the client to send the programmatic code units to the web server, which are then automatically installed at the web server through the API.

In one embodiment, sending the one or more selected programmatic code units to the web server (act 208) includes sending the one or more selected programmatic code units directly to the web server, without sending the one or more programmatic code units to the client first. The one or more programmatic code units can then be installed at the web server.

The method 200 may further include determining that to install the one or more programmatic code units at the web server that additional programmatic code units need to be installed at the web server. As a result, the method 200 may further include providing an indication to the web server that the additional programmatic code units need to be installed at the web server. For example, if programmatic code is selected to be installed that requires a database to be installed at the web server, and no database is installed at the web server, then an indication can be provided at the web server that a database application needs to be installed at the web server. The additional programmatic code units may be provided from the data store to the web server. Notably, the data store may be implemented as a distributed system such that different programmatic units are provided from different physical machines. The additional programmatic code units can then be installed automatically at the web server or by a machine administrator interacting with the machine hosting the web server.

Notably, embodiments may be implemented where the web server includes access control rules specific to a user at the client. The access control rules allow installation of the one or more programmatic code units. This may be accomplished in a number of different ways. For example, in one embodiment, a user can provide appropriate authentication information such as passwords or other tokens that can be used to authenticate the user at the client. Once the user has been authenticated, it can be determined that the user has appropriate permissions to cause the installation of the programmatic code units. Additionally, users may be limited as to what programmatic code units can be installed. For example, as described above, the web server may be maintained by a third party service provider. The use of the web server may be governed by a rental agreement that allows certain functionality to be implemented. So long as the user in not requesting that modules that would cause the web server to provide functionality that exceeds the allowed functionality, then the requested programmatic code units will be installed on the web server.

The programmatic code units may include various different types of code. For example, in one embodiment, the programmatic code units may include application code. For example the programmatic code units may include database application or other applications.

In alternative embodiments, the programmatic code units may include module code. Modules are code that are implemented as add-ons to the web-server.

Figure 3:
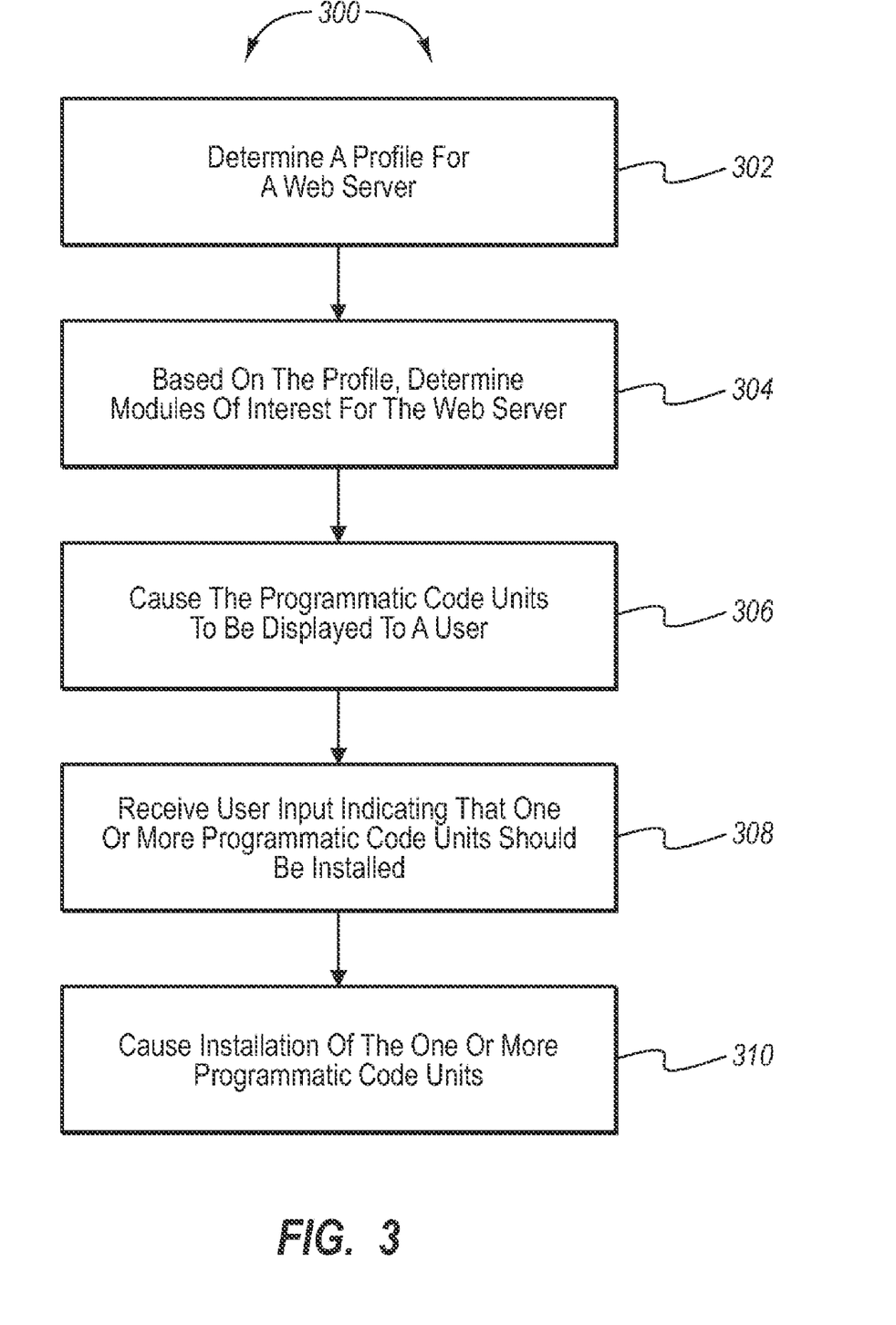
FIG. 3 illustrates a method of updating web server functionality.

Referring now to FIG. 3, a method 300 is illustrated. The method 300 may be practiced in a computing environment including one or more web servers. The method includes acts for updating the web server functionality. The method 300 includes determining a profile for a web server (act 302). For example, a profile for web server 102 may be determined. The profile may include information about programmatic code units installed on the web server 102, one or more administrators of the web server 102, users of the web server 102, or other information.

The method 300 further includes based on the profile for the web server, determining programmatic code units that may be modules of interest for the web server (act 304). Determining programmatic units that may be modules of interest for the web server may be performed using a number of different acts. For example, in some embodiments, the profile includes information related to programmatic code units already installed at the web server. A determination may be made to provide information related to updates or programmatic code units providing additional functionality to the already installed programmatic code units.

In some embodiments, the profile includes information related to administrators of the web server. As noted previously, information about an administrators interests, past selections, or other information about an administrator may be used to suggest programmatic code units.

In some embodiments, the profile includes information related to users of the web server.

The method 300 further includes causing the programmatic code units of interest to be displayed to a user (act 306). The act causing information about the programmatic code units of interest to be displayed to a user may be performed, in one example embodiment by sending information to a client computer system where the information can be displayed. For example, a repository 106 may send feature information 110 in the form of a web page or other form to the client 104, where the feature information 110 can be displayed to an administrator of a web server 102.

The method 300 further includes receiving user input indicating that one or more programmatic code units should be installed (act 308). For example, an administrator of the web server 102 may interact with selectable user interface elements displayed with the feature information 110 that allows for indicating that one or more programmatic code units should be installed.

The method 300 further includes causing installation of the one or more programmatic code units indicated in the user input at the web server (act 310). As described previously, installation may occur is some example embodiments, automatically or by a machine administrator interacting with a web server.

Embodiments herein may comprise a special purpose or general-purpose computer including various computer hardware, as discussed in greater detail below.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, implemented at a repository computer system that includes one or more processors and system memory, for providing a module to a server computer system for installation at the server computer system, the method comprising:

an act of the repository computer system receiving server profile information, the server profile information including the identity of one or more first modules that are already installed on the server computer system, wherein the repository computer system, a client computer system, and the server computer system are each separate computer systems;

based on receiving the server profile information, an act of the repository computer system identifying at least one module that is appropriate for installation at the server computer system, the at least one module being selected from among the one or more second modules, including:

comparing the one or more first modules that are already installed on the server computer system with the one or more second modules that are stored at the repository computer system and that are available for installation at the server computer system, identifying that the at least one module is commonly installed at servers that include modules that are similar to the one or more first modules that are already installed on the server computer system, and identifying that the at least one module is of interest to one or more users of the server computer system based on one or more geographical locations of the one or more users when accessing the server computer system and on one or more types of connections that are used by the one or more users to access the server computer system;

an act of the repository computer system generating feature information, the feature information at least identifying the at least one module that was selected from the one or more second modules that are available for installation at the server computer system;

an act of the repository computer system sending the feature information to the client computer system;

subsequent to sending the feature information to the client computer system, an act of the repository computer system receiving a request from the client computer system, the request requesting that the at least one module that was identified in the feature information be installed at the server computer system; and based on the request, an act of the repository computer system initiating installation of the at least one module at the server computer system, including an act of the repository computer system sending the at least one module to the server computer system directly for installation exclusive of further interaction by the client computer system.

2. The method as recited in claim 1, wherein the act of the repository computer system receiving server profile information comprises and act of the repository computer system receiving the server profile information from the server computer system.

3. The method as recited in claim 1, wherein the server profile information includes the identity of one or more administrators who manage the server computer system.

4. The method as recited in claim 1, wherein the server profile information includes the identity of one or more users who use the server computer system.

5. The method as recited in claim 1, wherein the act of the repository computer system receiving server profile information comprises and act of the repository computer system receiving the server profile information from the client computer system.

6. The method as recited in claim 1, wherein the server computer system comprises a web server computer system, and wherein the server profile information comprises web server profile information.

7. The method as recited in claim 1, wherein the act of the repository computer system initiating installation of the at least one module at the server computer system comprises an act of the repository computer system sending the at least one module to the client computer system.

8. The method as recited in claim 1, wherein the act of the repository computer system identifying at least one module that is appropriate for installation at the server computer system comprises one or more of:

an act of the repository computer system identifying that the at least one module provides an update to the one or more first modules that are already installed on the server computer system; or an act of the repository computer system identifying that the at least one module provides additional functionality to the one or more first modules that are already installed on the server computer system.

9. The method as recited in claim 1, wherein the act of the repository computer system identifying at least one module that is appropriate for installation at the server computer system comprises an act of the repository computer system identifying that the at least one module is of interest to one or more administrators who manage the server computer system based on one or more of:

profile information that is associated with the one or more administrators; or previous interaction of the one or more administrators with the repository computer system.

10. The method as recited in claim 1, wherein the feature information includes one or more of: a ranking of modules, an organization of modules based on relevance, or user reviews.

11. A computer program product comprising one or more physical storage devices storing computer-executable instructions that, when executed by one or more processors of a repository computer system, cause the repository computer system to implement a method for providing a module to a server computer system for installation at the server computer system, the method comprising:

an act of repository computer system receiving server profile information, the server profile information including the identity of one or more first modules that are already installed on the server computer system, wherein the repository computer system, a client computer system, and the server computer system are each separate computer systems;

based on receiving the server profile information, an act of the repository computer system identifying at least one module that is appropriate for installation at the server computer system, the at least one module being selected from among the one or more second modules, including:

comparing the one or more first modules that are already installed on the server computer system with the one or more second modules that are stored at the repository computer system and that are available for installation at the server computer system, identifying that the at least one module is commonly installed at servers that include modules that are similar to the one or more first modules that are already installed on the server computer system, and identifying that the at least one module is of interest to one or more users of the server computer system based on one or more geographical locations of the one or more users when accessing the server computer system and on one or more types of connections that are used by the one or more users to access the server computer system;

an act of the repository computer system generating feature information, the feature information at least identifying the at least one module that was selected from the one or more second modules that are available for installation at the server computer system;

an act of the repository computer system sending the feature information to the client computer system;

subsequent to sending the feature information to the client computer system, an act of the repository computer system receiving a request from the client computer system, the request requesting that the at least one module that was identified in the feature information be installed at the server computer system; and based on the request, an act of the repository computer system initiating installation of the at least one module at the server computer system, including an act of the repository computer system sending the at least one module to the server computer system directly for installation exclusive of further interaction by the client computer system.

12. The computer program product as recited in claim 11, wherein the act of the repository computer system identifying at least one module that is appropriate for installation at the server computer system comprises an act of the repository computer system identifying that the at least one module provides an update to the one or more first modules that are already installed on the server computer system.

13. The computer program product as recited in claim 11, wherein the act of the repository computer system identifying at least one module that is appropriate for installation at the server computer system comprises an act of the repository computer system identifying that the at least one module provides additional functionality to the one or more first modules that are already installed on the server computer system.

14. The computer program product as recited in claim 11, wherein the act of the repository computer system receiving server profile information comprises and act of the repository computer system receiving the server profile information from the client computer system.

15. The computer program product as recited in claim 11, wherein the act of the repository computer system initiating installation of the at least one module at the server computer system comprises an act of the repository computer system sending the at least one module to the client computer system.

16. A repository computer system, comprising:
one or more processors;
system memory; and
one or more computer storage devices storing computer-executable instructions that, when executed by the one or more processors, cause the repository computer system to implement a method for providing a module to a server computer system for installation at the server computer system, including the following:
  receiving server profile information, the server profile information including the identity of one or more first modules that are already installed on the server computer system, wherein the repository computer system, a client computer system, and the server computer system are each separate computer systems;
  based on receiving the server profile information, identifying at least one module that is appropriate for installation at the server computer system, the at least one module being selected from among one or more second modules, including:
    comparing the one or more first modules that are already installed on the server computer system with the one or more second modules that are stored at the repository computer system and that are available for installation at the server computer system,
    identifying that the at least one module is commonly installed at servers that include modules that are similar to the one or more first modules that are already installed on the server computer system, and
    identifying that the at least one module is of interest to one or more users of the server computer system based on one or more geographical locations of the one or more users when accessing the server computer system and on one or more types of connections that are used by the one or more users to access the server computer system;
  generating feature information, the feature information at least identifying the at least one module that was selected from the one or more second modules that are available for installation at the server computer system;
  sending the feature information to the client computer system;
  subsequent to sending the feature information to the client computer system, receiving a request from the client computer system, the request requesting that the at least one module that was identified in the feature information be installed at the server computer system; and
  based on the request, initiating installation of the at least one module at the server computer system, including an act of the repository computer system sending the at least one module to the server computer system directly for installation exclusive of further interaction by the client computer system.

* * * * *